(12) United States Patent
Iancu et al.

(10) Patent No.: US 11,298,992 B2
(45) Date of Patent: Apr. 12, 2022

(54) METHOD FOR DETECTING A TYRE BLOWOUT RISK

(71) Applicants: Continental Automotive France, Toulouse (FR); Continental Automotive GmbH, Hannover (DE)

(72) Inventors: Silvius Iancu, Toulouse (FR); Jean-Charles Huard, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 0 days.

(21) Appl. No.: 17/299,511

(22) PCT Filed: Dec. 13, 2019

(86) PCT No.: PCT/EP2019/085171
§ 371 (c)(1),
(2) Date: Jun. 3, 2021

(87) PCT Pub. No.: WO2020/120769
PCT Pub. Date: Jun. 18, 2020

(65) Prior Publication Data
US 2022/0001707 A1 Jan. 6, 2022

(30) Foreign Application Priority Data
Dec. 13, 2018 (FR) ...................................... 1872817

(51) Int. Cl.
*B60C 23/20* (2006.01)
(52) U.S. Cl.
CPC ................................... *B60C 23/20* (2013.01)

(58) Field of Classification Search
CPC ................................................... B60C 23/20
See application file for complete search history.

(56) References Cited

U.S. PATENT DOCUMENTS

2013/0234847 A1    9/2013    Carson et al.

FOREIGN PATENT DOCUMENTS

| EP | 1544002 A1 | 6/2005 | |
|----|------------|--------|---|
| GB | 2088607 A  | 6/1982 | |
| WO | WO-0117806 A1 * | 3/2001 | ............. B60C 23/20 |

OTHER PUBLICATIONS

English Translation of the Written Opinion for International Application No. PCT/EP2019/085171, dated Feb. 19, 2020, 5 pages.

(Continued)

*Primary Examiner* — James M McPherson
*Assistant Examiner* — Kyle J Kingsland
(74) *Attorney, Agent, or Firm* — RatnerPrestia

(57) ABSTRACT

A method for detecting the risk of blowout of a tire fitted to a motor vehicle, the method including the steps of measuring the temperature of the gases in the tire, if the measured temperature value is higher than or equal to a first threshold, determining a change in the measured temperature over a first time period and comparing the measured temperature value with a second threshold, if the measured temperature has increased by a value higher than or equal to a threshold difference or, if the measured temperature value is higher than or equal to the second threshold and higher than or equal to a third threshold or higher than or equal to a second threshold over a second time period, detecting a risk of blowout of the tire.

10 Claims, 3 Drawing Sheets

(56) References Cited

OTHER PUBLICATIONS

International Search Report and Written Opinion for International Application No. PCT/EP2019/085171, dated Feb. 19, 2020, with partial English translation, 8 pages.
International Search Report and Written Opinion for International Application No. PCT/EP2019/085171, dated Feb. 19, 2020, 12 pages (French).

* cited by examiner

METHOD FOR DETECTING A TYRE BLOWOUT RISK

CROSS REFERENCE TO RELATED APPLICATIONS

This application is the U.S. National Phase Application of PCT International Application No. PCT/EP2019/085171, filed Dec. 13, 2019, which claims priority to French Patent Application No. 1872817, filed Dec. 13, 2018, the contents of such applications being incorporated by reference herein.

FIELD OF THE INVENTION

The invention relates to the safety of the occupants of a vehicle and more particularly to a method and a computer for detecting a risk of blowout of a tire of a vehicle, in particular a motor vehicle. The invention aims in particular to anticipate the blowout of a tire so as to adjust the speed of the vehicle or to warn the driver so that they may prepare for an emergency maneuver.

BACKGROUND OF THE INVENTION

In a known manner, the tires of a vehicle are subjected to friction and impacts which lead to their wear or deterioration. In addition, when the vehicle is driven at high speeds or on a steep road, the tires may overheat.

Now, when a tire is worn, overheating or driving with the tire over a road surface in a state of disrepair may cause it to blow out, which may present a danger to the occupants of the vehicle.

In order to detect the blowout of a tire, it is known practice to use a pressure measurement sensor, fitted inside the tire, which allows a computer to detect a sudden drop in the pressure of the gases as the tire blows out and send a warning signal to the driver so that they may react accordingly.

However, in this solution, the warning signal is sent once the tire has blown out, which presents a significant drawback insofar as control of the vehicle may prove to be difficult for the driver once the tire has blown out. Indeed, the blowout of a tire presents a significant risk of accident depending on the conditions under which the vehicle finds itself. For example, when the vehicle is traveling at a high speed or when it is cornering, the blowout of a tire may cause loss of control of the vehicle, thus presenting a risk to the safety of the occupants of the vehicle.

In addition, in the case of a self-driving vehicle in which the system simply informs the driver that they must take back manual control of the vehicle, the late intervention of the driver increases the risk of loss of control of the vehicle, which presents a major drawback.

SUMMARY OF THE INVENTION

An aspect of the invention is therefore to at least partly overcome these drawbacks by providing a simple, reliable and effective solution for making driving a vehicle safer in the event of blowout of one of its tires.

To that end, a first aspect of the invention is a method for detecting a risk of blowout of a tire fitted to a vehicle, in particular a motor vehicle, comprising a plurality of tires, said tire comprising a sensor capable of periodically measuring a value of the temperature of the gases present inside said tire and of sending said measured temperature values to a computer of said vehicle, said tire being characterized by an internal temperature and a "standard" range representative of the internal temperatures of the tire in the absence of risk of blowout, said standard range comprising an upper limit, said method comprising the steps of:

periodically measuring, by means of said sensor, the temperature of the gases present inside the tire, sending each measured temperature value to said computer, receiving, by means of the computer, each measured temperature value sent by the sensor, if the measured temperature value is higher than or equal to a first threshold, higher than the upper limit of the standard range, determining, over a first predetermined time period, the change in the measured temperature and comparing the measured temperature value with a second threshold, higher than the first threshold, if the measured temperature has increased by a value higher than or equal to a threshold difference over the first predetermined time period, detecting, by means of the computer, a risk of blowout of the tire, if the measured temperature value is higher than or equal to the second threshold, comparing the measured temperature value with a third threshold, higher than the second threshold, if the measured temperature value is higher than or equal to the third threshold or if the measured temperature value is higher than or equal to the second threshold over a second predetermined time period, detecting, by means of the computer, a risk of blowout of the tire.

The method according to an aspect of the invention advantageously makes it possible to warn of the blowout of a tire before it occurs by monitoring in particular the change in the internal temperature of the tire with respect to thresholds and the speed of the change in the internal temperature of the tire with respect to a threshold difference, advantageously making it possible to limit the risk of accident and affording the driver the opportunity to make the vehicle and its occupants safe. The method according to an aspect of the invention makes it possible in particular to adjust the parameters of the vehicle such as, for example, its speed, or to warn the driver of a risk of blowout so that they prepare for an emergency maneuver.

Preferably, the method comprises, subsequent to the step of detecting a risk of blowout of the tire, a step of sending, by means of the computer, a warning signal to a driver of the vehicle. Such a warning signal advantageously makes it possible to warn the driver so that they may intervene and act accordingly in order to make the vehicle safe before the tire blows out.

According to one feature of the invention, said first temperature threshold is between 60 and 80 degrees Celsius, allowing a risk of blowout of a tire to be controlled only when the gases present inside the tire reach a temperature higher than standard internal temperatures of the tire.

Preferably, said second temperature threshold is between 80 and 100 degrees Celsius.

Preferably, said third temperature threshold is between 100 and 120 degrees Celsius, making it possible to ensure the detection of a risk of blowout of a tire before such a blowout occurs.

According to another feature of the invention, the threshold difference is smaller than 10 degrees Celsius, preferably of the order of 6 degrees Celsius (° C.), in order to ensure the detection of a risk of blowout of the tire before such a blowout occurs.

Advantageously, the first predetermined time period is shorter than or equal to 120 seconds, making it possible to detect a risk of blowout of the tire when the measured temperature changes rapidly, that is to say over a short time period.

Preferably, the second predetermined time period is longer than or equal to 300 seconds, making it possible to detect a risk of blowout of the tire when the measured temperature remains relatively high for a long time period.

Preferably, the method comprises, subsequent to the step of detecting a risk of blowout, a step of limiting, by means of the computer, the speed of the vehicle. Such a step advantageously makes it possible, when using such a method on a self-driving motor vehicle, to bypass the reaction time of the driver, whose attention is not necessarily focused on the road.

According to one feature of the invention, the first threshold is dependent on intrinsic characteristics of said tire and/or on data relating to the mileage of the vehicle, making it possible to adjust the first threshold according for example to the dimensions of the tire or to the number of kilometers traveled by the vehicle with such a tire.

An aspect of the invention also relates to a computer for a motor vehicle, said computer being configured to detect a risk of blowout of a tire fitted to said vehicle, said vehicle comprising a plurality of tires each comprising a sensor capable of periodically measuring a value of the temperature of the gases present inside said tire and of sending said measured temperature values to said computer of the vehicle, said tire being characterized by an internal temperature and a "standard" range representative of the internal temperatures of the tire in the absence of risk of blowout, said standard range comprising an upper limit, the computer being configured to implement the method as described above.

Advantageously, the computer is configured to:
receive measured temperature values sent periodically by each of the sensors,
for each sensor:
  compare a measured temperature value with a first threshold, higher than the upper limit of the standard range,
  if the measured temperature value received is higher than or equal to the first threshold, determine, over a first predetermined time period, the change in the measured temperature and compare the measured temperature value with a second threshold, higher than the first threshold,
  if the measured temperature has increased by a value higher than or equal to a threshold difference over the first predetermined time period, detect a risk of blowout of the tire,
  if the measured temperature value is higher than or equal to the second threshold, compare the measured temperature value with a third threshold, higher than the second threshold,
  if the measured temperature value is higher than or equal to the third threshold or if the measured temperature value is higher than or equal to the second threshold over a second predetermined time period, detect a risk of blowout of the tire.

According to one preferred embodiment of the invention, the computer is further configured to send a warning signal to a driver of the vehicle following the detection of a risk of blowout of the tire.

Alternatively, the computer is configured to compare the temperature value measured in a first tire and in a second tire of the vehicle and to detect a risk of blowout of one of the tires if:

the temperature value measured in the first tire is higher than or equal to the first temperature threshold,
the temperature value measured in the second tire is higher than or equal to the first temperature threshold, and
the absolute value of the difference between the temperature value measured in the first tire and the temperature value measured in the second tire is larger than or equal to a predetermined temperature difference.

Such a computer according to an aspect of the invention advantageously makes it possible to detect a risk of a blowout of the tire quickly simply by comparing the temperature of the gases of two tires, for example fitted to the same axle of the vehicle. Preferably, the temperature difference is larger than or equal to 25 degrees.

Another subject of the invention is a vehicle, in particular a motor vehicle, comprising a plurality of tires, each tire comprising a sensor capable of periodically measuring a value of the temperature of the gases present inside said tire, said tire being characterized by an internal temperature and a "standard" range representative of the internal temperatures of the tire in the absence of risk of blowout, said standard range comprising an upper limit, and a computer as described above.

According to one aspect of the invention, the sensor is configured to detect a significant change in the internal temperature and, in the event of detection, to modify the frequency of measurement and of sending the measured temperature value to the computer, advantageously allowing faster detection of a risk of blowout by the computer which will receive measured temperature values more frequently.

BRIEF DESCRIPTION OF THE DRAWINGS

Other features and advantages of aspects of the invention will become apparent from the following description, given with reference to the appended figures, which are given by way of non-limiting examples and in which identical references are given to similar objects.

DETAILED DESCRIPTION OF THE PREFERRED EMBODIMENTS

The device and the method according to an aspect of the invention are presented hereinafter for the purpose of implementation in a motor vehicle. However, any implementation in a different context, in particular for any vehicle comprising a tire presenting a risk of blowout, is also targeted by an aspect of the present invention.

Figure 1:
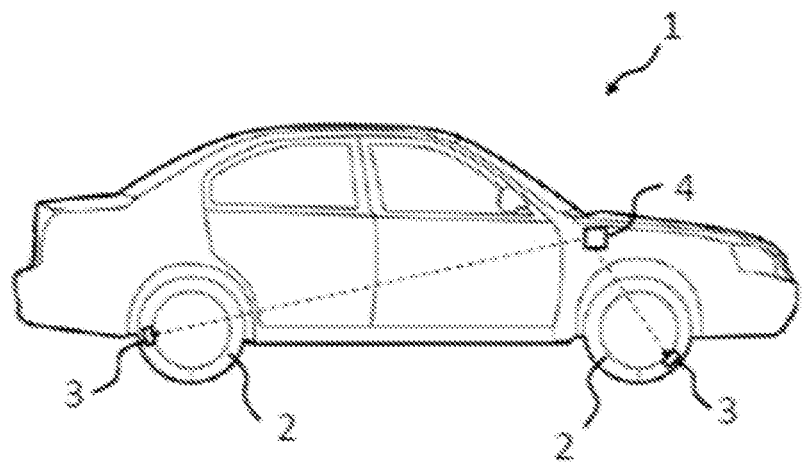
FIG. 1 schematically illustrates a motor vehicle comprising a system for detecting a risk of blowout of a tire according to one exemplary embodiment of the invention.

With reference to FIG. 1, a motor vehicle 1 generally comprises four wheels, each comprising a tire 2, allowing the vehicle 1 to move.

According to an aspect of the invention, each tire 2 comprises a sensor 3 configured to measure the temperature of the gases present in the tire 2. In this example, the temperature is measured by a TPMS (which stands for tire pressure measurement system)-type sensor, allowing the use of a sensor already installed in the vehicle 1. Specifically, such a sensor, known to those skilled in the art, is generally designed to measure the pressure in the tire 2, however such a sensor also comprises in a known manner a module for measuring the temperature, so as to measure the temperature of the gases present inside the tire 2. It should be noted that the sensor 3 could be a simple temperature measurement sensor.

The sensor 3 may be fitted on the inflation valve of the tire 2 inside said tire 2 or else bonded on the inside of the tread of the tire 2, that is to say inside the tire 2, on the inner surface of the portion of the tire 2 which comes into contact with the road, in a manner known per se.

Figure 2:
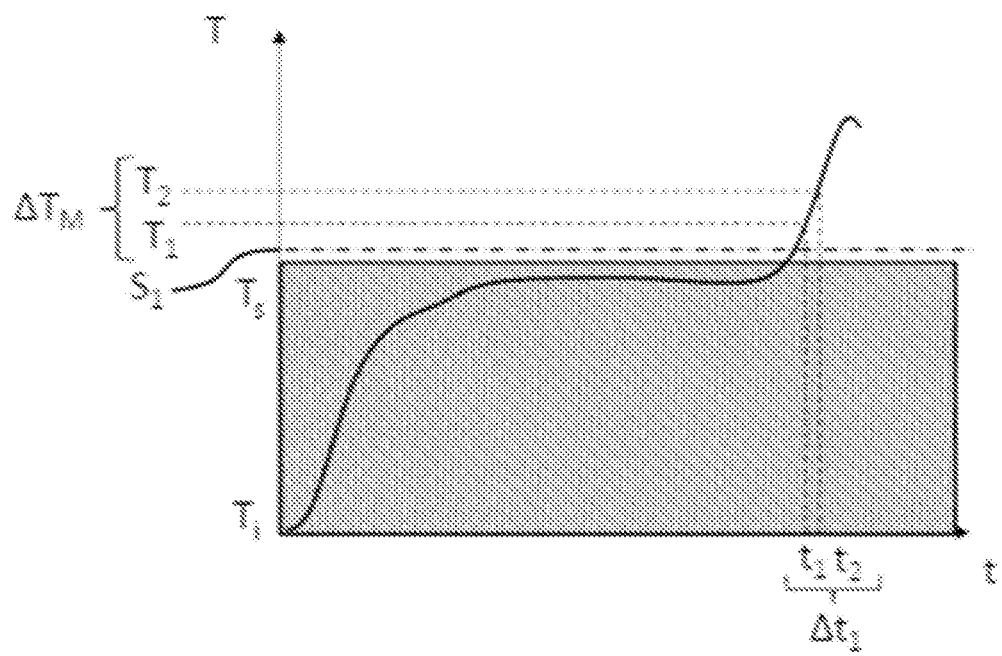
FIGS. 2-4 each graphically illustrate an exemplary condition for detecting a risk of blowout of a tire by a computer according to an aspect of the invention.

In a known manner, in conventional operation of the vehicle 1, the temperature of the gases present inside each tire 2, referred to hereinafter as "internal temperature T", increases over time t according in particular to the speed of the vehicle 1 (and therefore to the friction of the tire 2 on the road surface) and to the external conditions. With reference to FIG. 2, the internal temperature T changes, over time t, within a range of temperatures called the "standard range", representative of the internal temperatures T of the tire 2 in the absence of risk of blowout, this standard range potentially varying depending on the type of tire 2, on its manufacturer or on its dimensions.

The standard temperature range comprises a lower limit $T_I$ and an upper limit $T_S$. The lower limit $T_I$ corresponds for example to the ambient temperature of the location in which the vehicle 1 is operating, which corresponds substantially to the internal temperature T of the tires 2 when cold when the vehicle 1 has been stationary for a sufficiently long time, for example between 0° C. and 30° C. The upper limit $T_S$ is for example between 50° C. and 70° C. Conventionally, when the tires 2 of the vehicle 1 do not present a risk of blowout, the internal temperature T of the tire 2 increases by a value of between 20 and 40° C. in comparison with the initial ambient temperature when the vehicle 1 begins to drive.

The sensor 3 is configured to periodically measure the internal temperature T of the tire 2 and to send, for example periodically, the measured temperature values $T_M$ to a main computer 4 (shown in FIG. 1) for controlling the engine/motor of the vehicle 1. The sensor 3 is preferably configured to measure and to send, for example every 64 seconds, a measured temperature value $T_M$ to the computer 4.

The sensor 3 may additionally be configured to detect a significant change in the internal temperature T, for example a gradient of +/−2° over 64 s, and, in the event of detection of such a gradient, to modify the frequency of measurement and of sending the measured temperature value $T_M$ to the computer 4. By way of example, when the sensor 3 detects a temperature gradient higher than 2 degrees/min, then it is configured to measure and to send the measured temperature value $T_M$ to the computer 4 periodically, for example every 16 s. Such a modification of the frequency of measurement of the internal temperature T of the tire 2 advantageously allows faster detection of a risk of blowout by the computer 4 which will receive measured temperature values $T_M$ more frequently. In the event of a very rapid change in the internal temperature T of the tire 2, for example a substantial change within a period shorter than 64 seconds, the computer 4 will then be able to detect a risk of blowout more quickly, allowing the safety of the occupants of the vehicle 1 to be bolstered.

The computer 4 is configured to receive the temperature values $T_M$ measured inside the tires 2 of the vehicle 1 by each of the sensors 3. In other words, the computer 4 is configured to receive, for each tire 2, a plurality of measured temperature values $T_M$ at different times and to detect a risk of blowout of one of the tires 2 according to the measured temperature values $T_M$, in particular according to the change in temperature $T_M$ measured over time t.

To that end, the computer 4 is configured to compare the temperature value $T_M$ measured in a tire 2 of the vehicle 1 at a given time with a first temperature threshold $S_1$, beyond which the computer 4 is configured to analyze a risk of blowout of the tire 2. Such a first temperature threshold $S_1$, strictly higher than the upper limit $T_S$ of the standard temperature range described above, is, in this example, between 60 and 80 degrees Celsius.

According to one preferred aspect of the invention, the first threshold $S_1$ is dependent on the intrinsic characteristics of the tire 2, such as the brand or the dimensions of the tire 2. The first threshold $S_1$ may also be dependent on the mileage or on the speed of the vehicle 1, advantageously making it possible to adjust the warning level, for example on the aging of the tire 2. Indeed, in this example, the first temperature threshold $S_1$ may be adjustable and for example be modified regularly (for example each time the vehicle 1 is started) by the computer 4.

Figure 3:
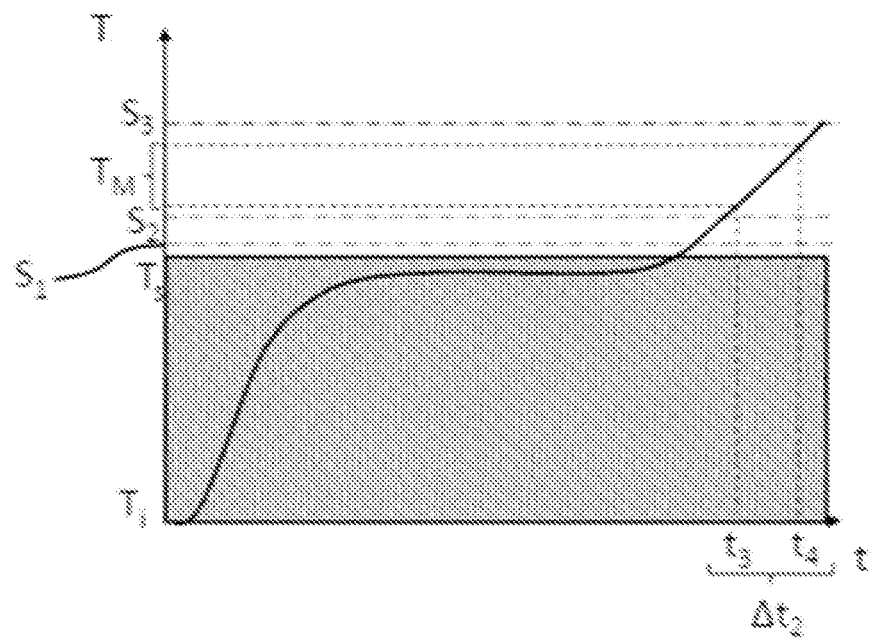

According to one embodiment of the invention, as shown in FIGS. 2 and 3, when the measured temperature value $T_M$ is higher than or equal to the first temperature threshold $S_1$, the computer 4 is configured to compare the measured temperature value $T_M$ with a second temperature threshold $S_2$ (FIG. 3), as will be described in greater detail below, and to measure, over a first predetermined time period $\Delta t_1$, the change in the measured temperature value $T_M$, an increase in which is denoted by $\Delta T_M$ (FIG. 2). In this example, the first predetermined time period $\Delta t_1$ is for example shorter than or equal to 120 seconds.

With reference to FIG. 2, the change in the measured temperature $T_M$ is determined between a first temperature value $T_1$, measured at a first time $t_1$, and a second temperature value $T_2$, measured at a second time $t_2$. The difference between $t_2$ and $t_1$ thus corresponds to the first time period $\Delta t_1$. The computer 4 is thus configured to compare the increase $\Delta T_M$ in the measured temperature $T_M$ between the first temperature value $T_1$ and the second temperature value $T_2$ with a predetermined temperature threshold difference $\Delta S$. When the change in the measured temperature $T_M$ corresponds to an increase $\Delta T_M$ that is higher than or equal to the predetermined threshold difference $\Delta S$, the computer 4 is configured to detect a risk of blowout of the tire 2. The threshold difference $\Delta S$ may for example be of the order of 6° C.

As described above, the computer 4 is further configured to compare the measured temperature value $T_M$ with a second temperature threshold $S_2$, strictly higher than the first temperature threshold $S_1$. In this example, the second temperature threshold $S_2$ is for example between 80 and 100° C.

When the measured temperature value $T_M$ is higher than or equal to the second threshold $S_2$, the computer 4 is configured to compare the measured temperature value $T_M$ with a third temperature threshold $S_3$, strictly higher than the second temperature threshold $S_2$, and to monitor, over a second predetermined time period $\Delta t_2$, a change in the measured temperature value $T_M$.

Specifically, as shown in FIG. 3, when the measured temperature value $T_M$ remains higher than the second temperature threshold $S_2$ for the second time period $\Delta t_2$, measured between a third time $t_3$ and a fourth time $t_4$, the computer 4 is configured to detect a risk of blowout of the tire 2. According to one exemplary embodiment of the invention, the second time period $\Delta t_2$ is longer than or equal to 300 seconds.

Figure 4:
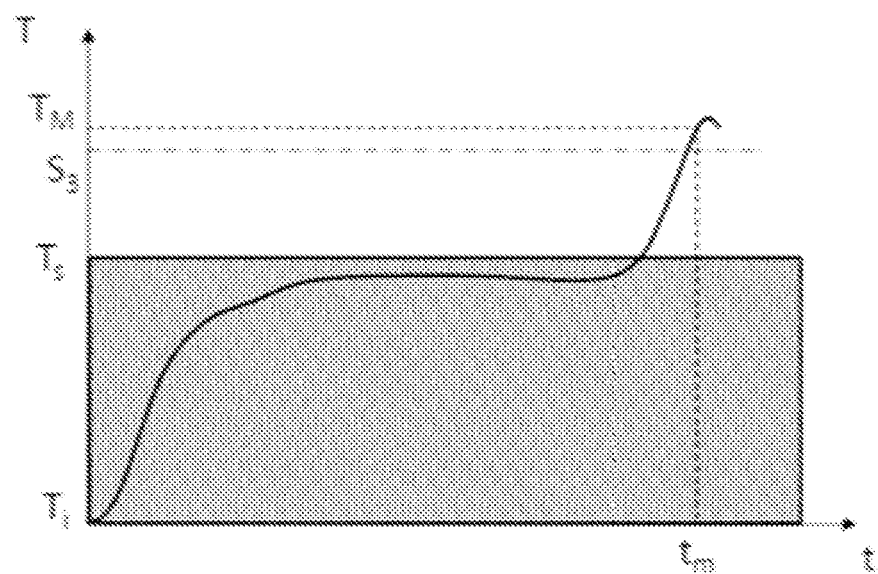

As described above, the computer 4 is additionally configured to compare the measured temperature value $T_M$ with a third predetermined temperature threshold $S_3$, for example between 100 and 120° C. With reference to FIG. 4, when the temperature value $T_M$ measured at a time $t_m$ is higher than or equal to the third threshold $S_3$, the computer 4 is also configured to detect a risk of blowout of the tire 2.

In one alternative embodiment, the computer 4 is configured to receive, at a given time, a temperature value $T_M$ measured in each of the four tires 2 of the vehicle 1, the measured temperature values $T_M$ being sent by a plurality of sensors 3, each fitted in one of the four tires 2 of the vehicle 1.

In this embodiment, the computer 4 is configured to detect a risk of blowout of one of the tires 2 when the temperature value $T_M$ measured in a first tire 2 and the temperature value $T_M$ measured in a second tire 2 are higher than or equal to the aforementioned first temperature threshold $S_1$ and the difference between the temperature value $T_M$ measured in the first tire 2 and the temperature value $T_M$ measured in the second tire 2 is larger than or equal to a predetermined temperature difference. Preferably, in this example, such a predetermined temperature difference is of the order of 25 degrees.

Preferably, in this embodiment, the computer 4 is configured to compare the temperature value $T_M$ measured in two tires 2 fitted to the same axle, in other words the computer 4 is configured to compare, in pairs, the two tires 2 fitted at the front of the vehicle 1 or the two tires 2 fitted at the rear. Such a comparison advantageously makes it possible to limit false detection of a risk of blowout due for example to the temperature difference between the front tires 2 and the rear tires 2, the temperature of which may differ by up to 25° C. when braking for example.

The computer 4 according to an aspect of the invention advantageously makes it possible to warn of the blowout of a tire 2, advantageously making it possible to limit the risk of accident and affording the driver the opportunity to make the vehicle 1 and its occupants safe.

Figure 5:
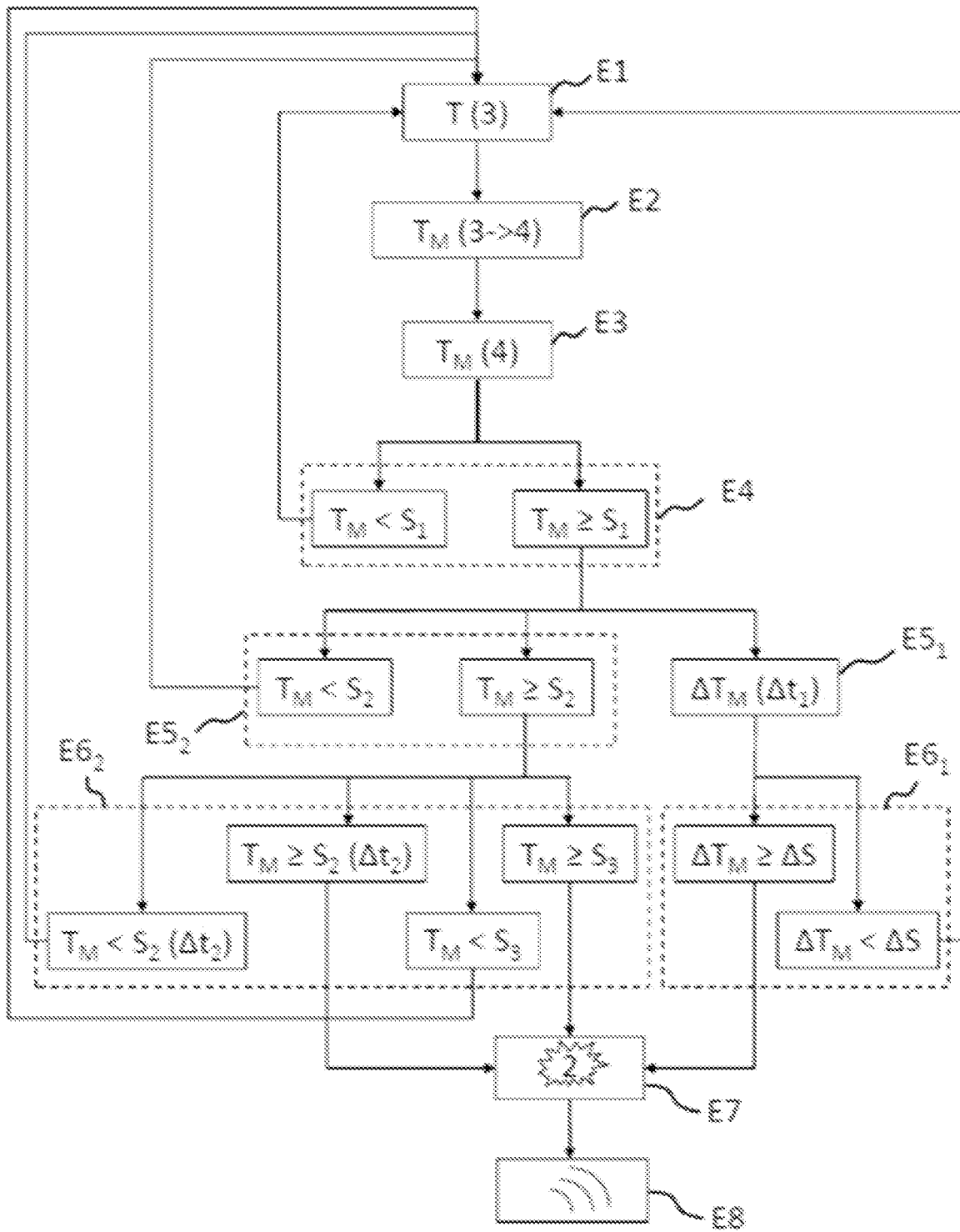
FIG. 5 schematically illustrates one embodiment of the detection method according to the invention.

A method for detecting a risk of blowout of a tire 2 will now be described, with reference to FIG. 5, according to one preferred embodiment of the invention.

The method for detecting a risk of blowout according to an aspect of the invention first of all comprises a step E1 of measuring, by means of the sensor 3 fitted in the tire 2, the internal temperature T of such a tire 2. The measured temperature value $T_M$ is then sent, in a step E2, by the sensor 3 to the engine/motor control computer 4 of the vehicle 1. The computer 4 then receives, in a step E3, the measured temperature value $T_M$ sent by the sensor 3.

The computer 4 then compares, in a step E4, the measured temperature value $T_M$ with a first temperature threshold $S_1$.

In this step, when the measured temperature value $T_M$ is lower than the first threshold $S_1$, the method returns to step E1 of measuring, by means of the sensor 3 fitted in the tire 2, the internal temperature T of such a tire 2.

When the measured temperature value $T_M$ is higher than or equal to the first temperature threshold $S_1$, the computer 4 determines, in a step $E5_1$, over a first predetermined time period $\Delta t_1$, an increase $\Delta T_M$ in measured temperature $T_M$ and compares, in a step $E5_2$, the measured temperature value $T_M$ with a second temperature threshold $S_2$.

Following step $E5_1$, the computer 4 compares, in a step $E6_1$, the increase $\Delta T_M$ in measured temperature $T_M$ with a predetermined temperature threshold difference $\Delta S$. When the increase $\Delta T_M$ in measured temperature $T_M$ is larger than or equal to the predetermined threshold difference $\Delta S$, the computer 4 detects, in a step E7, a risk of blowout of the tire 2.

In this step, when the increase $\Delta T_M$ in measured temperature $T_M$ is smaller than the predetermined threshold difference $\Delta S$, the method returns to step E1 of measuring, by means of the sensor 3 fitted in the tire 2, the internal temperature T of such a tire 2.

Following step $E5_2$, when the measured temperature value $T_M$ is lower than the second temperature threshold $S_2$, the method returns to step E1 of measuring, by means of the sensor 3 fitted in the tire 2, the internal temperature T of such a tire 2.

When the measured temperature value $T_M$ is higher than or equal to the second threshold $S_2$, the computer 4 compares, in a step $E6_2$, the measured temperature value $T_M$ with a third temperature threshold $S_3$, and monitors, over a second predetermined time period $\Delta t_2$, a change in the measured temperature value $T_M$.

In this step, when the measured temperature value $T_M$ remains higher than the second temperature threshold $S_2$ for the second time period $\Delta t_2$, the computer 4 detects, in step E7, a risk of blowout of the tire 2.

When the measured temperature value $T_M$ returns, in the second time period $\Delta t_2$, to below the second temperature threshold $S_2$, then the method returns to step E1 of measuring, by means of the sensor 3 fitted in the tire 2, the internal temperature T of such a tire 2.

Still in this same step, when the measured temperature value $T_M$ is higher than or equal to the third threshold $S_3$, the computer 4 detects, in step E7, a risk of blowout of the tire 2.

In addition, when the measured temperature value $T_M$ is lower than the third threshold $S_3$, the method returns to step E1 of measuring, by means of the sensor 3 fitted in the tire 2, the internal temperature T of such a tire 2.

According to one preferred embodiment, when a risk of blowout of a tire 2 has been detected by the computer 4, the detection method lastly comprises a step E8 of sending a warning signal to the driver of the vehicle 1, so that they may intervene. Such a warning signal, which may for example be a visual or sound signal, allows the driver to anticipate an emergency maneuver before the blowout of the tire 2 occurs. Optionally, the computer 4 could also control a series of instructions with a view to making the vehicle 1 safe, such as for example limiting the speed.

The detection method according to an aspect of the invention advantageously makes it possible to warn of the blowout of a tire before such an event occurs, thus allowing the driver to intervene and slow down or even stop the vehicle in complete safety before the tire blows out.

Such a method is particularly advantageous when it is implemented in a self-driving vehicle since it allows the thinking times and the reflexes of the driver to be bypassed, the attention of whom may not be focused on driving the vehicle when the warning signal is sent.

The invention claimed is:

1. A method for detecting a risk of blowout of a tire fitted to a vehicle, comprising a plurality of tires, said tire comprising a sensor capable of periodically measuring a value of the temperature of the gases present inside said tire and of sending said measured temperature values to a computer of said vehicle, said tire being characterized by an internal temperature and a "standard" range representative of the internal temperatures of the tire in the absence of risk of blowout, said standard range comprising an upper limit, said method comprising:

periodically measuring, by said sensor, the temperature of the gases present inside the tire, sending each measured temperature value to said computer, receiving, by the computer, each measured temperature value sent by the sensor, when the measured temperature value is higher than or equal to a first threshold, higher than the upper limit of the standard range, determining, over a first predetermined time period, the change in the measured temperature and comparing the measured temperature value with a second threshold, higher than the first threshold, when the measured temperature has increased by a value higher than or equal to a threshold difference over the first predetermined time period, detecting, by the computer, a risk of blowout of the tire, when the measured temperature value is higher than or equal to the second threshold, comparing the measured temperature value with a third threshold, higher than the second threshold, when the measured temperature value is higher than or equal to the third threshold or when the measured temperature value is higher than or equal to the second threshold over a second predetermined time period, detecting, by the computer, a risk of blowout of the tire.

2. The method as claimed in claim 1, comprising, subsequent to the step of detecting a risk of blowout of the tire, a step of sending, by the computer, a warning signal to a driver of the vehicle.

3. The method as claimed in claim 1, wherein said first temperature threshold is between 60 and 80 degrees Celsius.

4. The method as claimed in claim 1, wherein said second temperature threshold is between 80 and 100 degrees Celsius.

5. The method as claimed in claim 1, wherein said third temperature threshold is between 100 and 120 degrees Celsius.

6. The method as claimed in claim 1, wherein the threshold difference is smaller than 10 degrees Celsius.

7. The method as claimed in claim 1, wherein the first predetermined time period is shorter than or equal to 120 seconds.

8. The method as claimed in claim 1, wherein the second predetermined time period is longer than or equal to 300 seconds.

9. A computer configured to detect a risk of blowout of a tire fitted to a vehicle, comprising a plurality of tires, said tire comprising a sensor capable of periodically measuring a value of the temperature of the gases present inside said tire and of sending said measured temperature values to said computer of the vehicle, said tire being characterized by an internal temperature and a "standard" range representative of the internal temperatures of the tire in the absence of risk of blowout, said standard range comprising an upper limit, the computer being configured to implement a method comprising:

periodically measuring, by said sensor, the temperature of the gases present inside the tire, sending each measured temperature value to said computer, receiving, by the computer, each measured temperature value sent by the sensor, when the measured temperature value is higher than or equal to a first threshold, higher than the upper limit of the standard range, determining, over a first predetermined time period, the change in the measured temperature and comparing the measured temperature value with a second threshold, higher than the first threshold, when the measured temperature has increased by a value higher than or equal to a threshold difference over the first predetermined time period, detecting, by the computer, a risk of blowout of the tire, when the measured temperature value is higher than or equal to the second threshold, comparing the measured temperature value with a third threshold, higher than the second threshold, when the measured temperature value is higher than or equal to the third threshold or when the measured temperature value is higher than or equal to the second threshold over a second predetermined time period, detecting, by the computer, a risk of blowout of the tire.

10. A vehicle comprising a plurality of tires, each tire comprising a sensor capable of periodically measuring a value of the temperature of the gases present inside said tire, said tire being characterized by an internal temperature and a "standard" range representative of the internal temperatures of the tire in the absence of risk of blowout, said standard range comprising an upper limit, and a computer configured to implement a method comprising:

periodically measuring, by said sensor, the temperature of the gases present inside the tire, sending each measured temperature value to said computer, receiving, by the computer, each measured temperature value sent by the sensor, when the measured temperature value is higher than or equal to a first threshold, higher than the upper limit of the standard range, determining, over a first predetermined time period, the change in the measured temperature and comparing the measured temperature value with a second threshold, higher than the first threshold, when the measured temperature has increased by a value higher than or equal to a threshold difference over the first predetermined time period, detecting, by the computer, a risk of blowout of the tire, when the measured temperature value is higher than or equal to the second threshold, comparing the measured temperature value with a third threshold, higher than the second threshold, when the measured temperature value is higher than or equal to the third threshold or when the measured temperature value is higher than or equal to the second threshold over a second predetermined time period, detecting, by the computer, a risk of blowout of the tire.

* * * * *